United States Patent [19]

Van Vonno

[11] 4,040,996

[45] Aug. 9, 1977

[54] METHOD OF INCORPORATING PROCESSING ADDITIVES IN POLYVINYL CHLORIDE RESINS AND EMULSION FOR USE THEREIN

[75] Inventor: Nicolaas C. Van Vonno, Mountain Lakes, N.J.

[73] Assignee: American Hoechst Corporation, Bridgewater, N.J.

[21] Appl. No.: 665,176

[22] Filed: Mar. 9, 1976

[51] Int. Cl.² .................................................. C08L 91/00
[52] U.S. Cl. ................................ 260/23 XA; 106/271; 106/272; 260/28.5 D; 260/29.6 PM; 260/45.75 H; 427/222; 428/407
[58] Field of Search .................. 427/222; 428/407; 260/23 XA, 29.6 PM, 45.75 H, 28.5 D; 106/271, 272

[56] References Cited

U.S. PATENT DOCUMENTS

| | | |
|---|---|---|
| 3,067,162 | 12/1962 | Went et al. .................... 260/34.2 |
| 3,567,669 | 3/1971 | Georgiana et al. ............ 260/28.5 D |
| 3,862,066 | 1/1975 | Reiter et al. .................... 260/23 XA |

*Primary Examiner*—Melvyn I. Marquis
*Attorney, Agent, or Firm*—Curtis, Morris & Safford

[57] ABSTRACT

Processing additives are incorporated in polyvinyl chloride resins to form molding compositions by preparing an aqueous emulsion wherein the additives such as lubricants and stabilizers are in the disperse phase and then mixing an aliquot portion of the emulsion with a polyvinyl chloride resin powder in a high shear mixer to incorporate the additives in the resin in the proper proportions. By using an aqueous emulsion of the additives, the need for separately weighing each additive to be added to each batch of polyvinyl chloride is avoided and uniform dispersion of the additives in the resin achieved. The heat generated during the mixing process evaporates most of the water of the emulsion and the relatively small amount of retained water improves the anti-static properties of the molding composition.

15 Claims, No Drawings

METHOD OF INCORPORATING PROCESSING ADDITIVES IN POLYVINYL CHLORIDE RESINS AND EMULSION FOR USE THEREIN

This invention relates to a processing of polyvinyl chloride resins, and more particularly, to a novel and improved method of incorporating into a particulate polyvinyl chloride molding resin (hereafter PVC) the various additives such as processing lubricants, stabilizers, and the like required to provide a commercially acceptable molding composition. The invention also relates to an aqueous emulsion adapted to be used for incorporating processing aids into PVC in accordance with the method of the invention.

In the processing of PVC to form a moldable composition it is customary to incorporate into the polymer in dry powder form a variety of special purpose additives to achieve desired processing properties and molded product properties. Thus various natural and synthetic waxes, fatty acids and fatty acids salts are added to improve the processability of the polymer. Stabilizers, which may typically be liquid organo-tin compounds, are added to inhibit thermal and light degradation of the polymer. Pigments, e.g., titanium dioxide, and fillers, e.g, calcium carbonate, are added to improve the mechanical properties and the appearance of the molded products. Impact modifiers and processing aids may be added in particular cases to improve resistance and melt strength, respectively. The additives are commonly incorporated in the polymer powder in a mixer, usually a high shear wherein the mechanical working of the material causes its temperature to increase. The proper quantities of the several additives are weighed out and added to the mixer in a predetermined sequence. Typically the liquid stabilizer is added first and dispersed through the polymer powder at a relatively low temperature, after which the lubricants, i.e., the waxes and fatty acid metal salts are added. Usually the lubricant components include at least one wax that is of a sufficiently low melting point to be melted in the mixer and become distributed on the surfaces of the polymer powder. Thereafter other additives such as pigments and fillers may be added.

The foregoing procedure is subject to the disadvantage that it requires separate weighings of each additive for each batch of PVC that is mixed and is thus a rather time-consuming procedure. While it might appear that this problem could be circumvented by simply pre-mixing a large batch of additives in the proper proportions, and incorporating an aliquot portion of the pre-mix with each batch of polymer, it has been found that such a pre-mixing procedure is impractical because the differences in physical properties of the additives produce inhomogeneities in the mixture. Thus the liquid and solid additives tend to produce non-uniform agglomerations, either initially or upon storage. The wax lubricants can be melted and the liquid stabilizer added to form a homogeneous melt. However, when such a melt is cooled a semi-solid paste results which is difficult to handle in either a liquid or solid system. Also, after several days time the stablizer tends to migrate to the surface and separate from the wax. A few solid organo-tin stabilizers have been prepared but their low efficiency and high cost greatly limit their use in the highly competitive field of PVC processing. More generally, it has not been found possible to make a sufficiently complete and uniform mixture of the additives which can be handled using present facilities to assure that each portion of the mixture selected for admixture with a batch of PVC will have the same proportions of the different additives. This is critical since some additives are used in the compound in as low a level as 0.1 parts per hundred (phr) of resin.

Various methods of overcoming this problem have been previously proposed. Thus it has been suggested that a masterbatch be prepared by incorporating high concentrations of the additives in a relatively small amount of PVC and using an aliquot portion of the masterbatch for preparing each batch of molding composition. However, this proposal has proven to be impractical because of the the fact that only relatively small quantities of the additives can be incorporated in the PVC. High levels of additives result in over lubrication during high shear mixing. The lubricant melts and coats the blades of the mixer, reducing the shear heat. A non-uniform lumpy mass results. In order to obtain a homogeneous blend, only "double batching" is practical. Double batching involves the addition of twice the desired amount of additives to a given amount of PVC. Following high shear mixing, the resin can be mixed with an equal part of unblended resin. The resultant blend is not as uniform as a normally blended resin, but the time saving factor often outweighs this disadvantage.

It has also been suggested in Went et al. U.S. Pat. No. 3,067,162 that a plasticizer be dispersed in a vinyl resin by mixing an aqueous emulsion of the plasticizer with an aqueous dispersion of the resin and then de-watering the mixture. However, this process requires the additional step of preparing an aqueous dispersion of the resin and also requires the removal of a relatively large amount of water. Another prior proposal is dislosed in Reiter et al. U.S. Pat. No. 3,862,066 wherein it is suggested that the additives be mixed with the vinyl choride monomer prior to polymerization and that the polymerization be carried out in a reaction mixture containing the additives. This proposal is subject to the disadvantage that certain of the additives desirably used in making the polyvinyl chloride molding compositions adversely affect the polymerization reaction and/or the polymerization reaction may reduce the effectiveness of certain of the additives. Also, in cases where alkyl tin stabilizers are used, they must be added after polymerization is complete. Moreover, this method is limited to PVC processors having polymerization facilities.

In the preamble of the Reiter et al. patent there is a reference to a still earlier suggestion which involves dispersing or dissolving the additives in an organic liquid, impregnating the polyvinyl chloride granules with the organic liquid solution or suspension under pressure and then evaporating the solvent. This proposal is subject to the disadvantages that is involves the use of an elevated pressure and also requires the use of an organaic solent which is hazardous and expensive and must be recovered and re-used to be economical.

It is accordingly an object of the present invention to provide an improved method of incorporating conventional additives in polyvinyl chloride in the manufacture of polyvinyl chloride molding compounds. It is another object of the invention to provide a method whereby a relatively large quantity of polyvinyl chloride processing additives can be premixed in the proper proportions and the mixture stored or otherwise maintained as a stable finely dispersed mixture of uniform composition until an aliquot portion thereof is required for use in preparing a polyvinyl chloride molding composition. It is still another object of the invention to provide an aqueous emulsion of the additives especially adapted to be used as a medium for incorporating the additives in PVC in accordance with the present method. Other objects of the invention will be in part obvious and in part pointed out hereafter.

The objects of the invention are achieved in general by incorporating at least the processing lubricants and stabilizer additives to be used in the manufacture of PVC molding compositions in the raw polymer powder in the form of an aqueous emulsion. The use of an aqueous emulsion as a medium for incorporating the additive into the polmyer provides a number of significant advantages. Thus provides an exceptionally fine dispersion of the lubricant waxes which are not readily available as finely particulate solids and thus improves the dispersion of the waxes in the polyer. It also prevents the agglomeration of liquid and solid additives which occurs on simple mixing of the additives and provides fine dispersions of both the solid and liquid additives. The emulsion can be prepared to contain the proper relative amounts of additives for use in making the molding compositions and portions thereof admixed with the raw polymer powder with the assurance that the proper proportions of the additives will be incorporated in the polymer. It is unnecessary to make separate weighings of each additive for each batch of molding compositon. It has been found that the major portion of the water of the emulsion can be readily evaporated from the molding composition in a short period of time in the high shear mixer and that the residual water tends to confer the anti-static properties on the final composition. The quantity of the emulsion used will usually fall within the range 2% to 10% by weight of the PVC.

In general the additives used in the emulsions employed in the present process are those conventionally used in the processing of PVC to form molding compositions. The lubricants commonly comprise one or more types of wax including, for example. hydrocarbon waxes, montan derived acid waxes, oxidized polyethylene waxes, petrolatum waxes and microcrystalline waxes. Also the lubricant may comprise a fatty acid or salt thereof, particularly the metal salts of higher fatty acids such as the stearates and palimitates of calcium, magnesium, aluminum and zinc. While various stabilizers can be used, the preferred stabilizers are the commercially available liquid organo-tin stabilizers. In general any of the lubricants and stabilizers known to be useful in the compounding of PVC molding compositions can be used in the present method. Known PVC additives are extensively disclosed in U.S. Pat. No. 3,862,066. The lubricant may comprise from 10% to 45% by weight of the emulsion, preferably 30% to 40% by weight, and stabilizer may comprise from 3% to 30% by weight thereof, preferably 10% to 15% by weight.

The stability of the emulsion is enchanced by inclusion of surface active agents and/or emulsifying agents therein. As indicated in the Examples given below, these may be organic non-ionic agents or aqueous inorganic alkalis or both. It has been found that aqueous inorganic alkalis are preferable as emulsifying agents to the amine emulsifying agents often used in wax emulsions since the aqueous alkali does not cause degradation of the PVC. The emulsifying agent andor surfactant may be used to the extent of say 0.1% to 5% by weight of the emulsion.

In order to point out more fully the nature of the invention, the following Examples are given of emulsions adapted to be used in carrying out the present method and illustrative embodiments of the method of the invention.

EXAMPLE 1

A metal beaker was charged with 360 grams of a hydrocarbon wax (Hoechst XL-165), 24 grams of a montan derived acid wax (Hoechst Wax U) and 20 grams of a nonionic alkyl phenol surfactant (Triton X-100). The components were melted by application of steam heat. When the mass had completely melted and a temperature of 110° C. had been obtained, 6 grams of a 43% potassium hydroxide solution was added. Following moderate stirring to effect saponification of the acid wax, the melt was added to a second beaker containing 550 grams of hot water (90°-99° C.). The water was vigorously stirred during addition of the waxes. The resulting emulsion was then crash cooled to about 40° C. The product was a creamy white, stable anionic/nonionic liquid emulsion.

When the water was added to the wax, rather than the wax to the water, the same result was obtained.

EXAMPLE 2

Example 1 was repeated with the exception that the montan derived acid was omitted. A creamy white liquid emulsion was formed which underwent slight separation after standing several days.

EXAMPLE 3

A metal beaker was charged with 360 grams of a hydrocarbon wax (Hoechst XL-165), 40 grams of an oxidized polyethylene wax (Epolene E-10), 24 grams of a montan derived wax (Hoechst Wax U), and 20 grams of a nonionic alkyl phenol surfactant (Triton X-100). Components were melted by application of steam heat and when the mass was completely melted and a temperature of 110° C. was attained, 6 grams of a 43% potassium hydroxide solution was added. Following moderate stirring to effect saponification of the acid wax, the melt was added to a second beaker containing 550 grams of hot water at 90°-99° C. The water was vigorously stirred during addition of the waxes. The resulting emulsion was then crash cooled to about 40° C. The product was a creamy white anionicnonionic liquid emulsion.

EXAMPLE 4

Example 3 was repeated with the exception that 40 grams of an oxidized microcrystalline wax (Acid Number 20-25, Congealing Point 180° C.), was used instead of the oxidized polyethylene wax. A stable emulsion was obtained.

EXAMPLE 5

Emulsions were prepared wherein the 360 grams of hydrocarbon was used in Example 1 was replaced with:
1. A lower melting paraffin wax having a congealing point of 54° C. and a needle penetration of 14 mm.
2. A petrolatum wax having a congealing point 46° C.
3. A high melting microcrystalline wax having a congealing point of 90°C. and a needle penetration 8 mm.
In each case a stable emulsion was obtained.

EXAMPLE 6

A metal beaker was charged with 360 grams of a hydrocarbon wax (Hoechst XL-165), 28 grams of a sorbitan monostearate containing polyoxyethylene (Glycoperse 8-20) and 20 grams of a sorbitan monostearate (Glycomul S). The components were melted and heated to a temperature of 110° C. The melt was added to 550 grams of hot water at 98°-99° C. with stirring to form a nonionic emulsion.

EXAMPLE 7

A beaker was charged with 360 grams of a hydrocarbon wax (Hoechst XL-165), 30 grams of a montan derived acid wax (Hoechst Wax U), and 20 grams of Triethanolamine. The components were melted and heated to a temperature of 110° C. The melt was added to 550 grams of hot water at 90 °-99° C. with stirring to form a stable anionic emulsion.

EXAMPLE 8

One part of a nonionic polyoxyethylene surfactant (Hoechst Emulsogen LP) was added to 99 parts of a liquid tin stabilizer (Thermolite T-31) of the type commonly used in the stabilization of PVC. The emulsion prepared in Example 3 was then stirred at ambient temperature and 170 grams of the stabilizer/surfactant blend was added. A stable emulsion was obtained.

Essentially the same result was obtained when the T-31 stabilizer was replaced with various other commercial stabilizers, specifically, dimethyl tin (Cincinnati Milacron TM 387); dimethyl tin (Cincinnati Milacrom Tm 692); dibutyl tin (Cardinal CT-78); and dibutyltin (Interstab T-801).

EXAMPLE 9

To the emultion of Example 8 (using the T-31 stabilizer) was added 130 grams of calcium stearate having a particle size about 0.4 microns. Stirring the emulsion resulted in a uniform dispersion of lubricant polyethylene wax, stabilizer and calcium stearate. The resulting emulsion had the following composition:

| Component | Parts by Wt. | Percent by Wt. |
|---|---|---|
| Stabilizer (T-31) | 168 | 12.92 |
| Surfactant (Emulsogen LP) | 2 | 0.15 |
| Calcium Stearate | 130 | 10 |
| Hydrocarbon wax (XL-165) | 360 | 27.69 |
| Polyethylene wax (Epolene E-10) | 40 | 3.08 |
| Montan derived acid wax (Wax U) | 24 | 1.85 |
| Surfactant (Triton X-100) | 20 | 1.54 |
| Aqueous KOH - 43% by wt. water | 550 | 42.31 |

The mixture remained fluid for several days, after which a paste formed. Agitation of the paste again produced a free-flowing liquid.

EXAMPLE 10

To 1,000 grams of the emulsion of Example 3 were added a mixture of 168 grams of butyltin stabilizer (T-31) and 2 grams of surfactant (Emulsogen LP), as well as 130 grams of calcium stearate and 400 grams of acrylate polymer processing acid (Acryloid K-120 N). The emulsion was initially stable but became a semi-solid paste after several days. It could be again converted to a free-flowing liquid by agitation.

EXAMPLE 11

A Diosna Model R-10 high shear mixer was charged with 2000 grams of Geon 103-EP PVC resin. To this was added 65 grams of the emulsion of Example 9. The charged ingredients were mixed until a temperature of 72° C. was reached. Then 20 grams of acrylic polymer processing aid (Acryloid K-120 N) was added and mixing continued. At 80° C. 20 grams of titanium dioxide (rutile grade) and 60 grams of calcium carbonate (Omyalite 90T) were added and mixing continued for 120° C.

The mixture was then removed from the mixer and cooled to ambient temperature. The water content of the cooled resin was measured and found to be only about 0.1%. The molding properties of the product were found to be essentially the same as those of a resin composition prepared by a conventional process using the same quantities of the same additives.

EXAMPLE 12

A Diosna Model R-10 high shear mixer was charged with 2000 grams of Geon 103-EP PVC resin. To this was added 58 grams of the emulsion of Example 8 (using the T-31 stabilizer). The charged ingredients were mixed until a temperature of 72° C. was reached. Then 20 grams of Acryloid K120N processing aid and 8 grams of calcium stearate was added and mixing continued. At 80° C., 20 grams of titanium dioxide (rutile grade) and 60 grams of calcium carbonate (Omyalite 90-T) were added and mixing continued to 120° C.

The mixture was then removed from the mixer and cooled to ambient temperature. The water content of the cooled resin was measured and found to be only 0.1%. The molding properties of the product were found to be essentially the same as those of a resin composition prepared by a conventional process using the same quantities of the same additives.

EXAMPLE 13

A Diosna Model R-10 high shear mixer was charged with 2000 grams of Geon 103-EP PVC resin. To this was added an 85 gram portion of the emulsion of Example 10. The charged ingredients were mixed until a temperature of 120° C. was obtained. The mixture was then removed from the mixer and cooled to ambient temperature. The water content of the cooled resin was measured and found to be only about 0.1%. The molding properties of the product were found to be essentially the same as those of a resin composition prepared by a conventional process using the same quantities of the same additives.

It is, of course, to be understood that the foregoing Examples are intended to be illustrative only and that numerous changes can be made in the ingredients, proportions and conditions specifically disclosed therein without departing from the spirit of the invention as defined in the appended claims.

I claim:

1. The method of making a polyvinyl chloride molding composition which comprises adding to a body of particulate polyvinyl chloride an aqueous emulsion of a lubricating amount of a processing lubricant and a stabilizing amount of a stabilizer and mixing the resulting mixture at an elevated temperature to evaporate the water of the emulsion and the coat the polyvinyl chloride particles with said lubricant and stabilizer.

2. A method according to claim 1 wherein said lubricant is a hydrocarbon wax.

3. A method according to claim 1 wherein said lubricant is a mixture of hydrocarbon wax and montan derived acid wax.

4. A method according to claim 1 wherein said lubricant is a mixture of hydrocarbon wax and oxidized polyethylene wax.

5. A method according to claim 1 wherein said lubricant is a mixture of hydrocarbon wax, oxidized polyethylene wax and montan derived acid wax.

6. A method according to claim 1 wherein said lubricant is a mixture of hydrocarbon wax and a alkaline earth metal salt of an organic acid.

7. A method according to claim 1 wherein said lubricant is a mixture of hydrocarbon wax and calcium stearate.

8. A method according to claim 1 wherein said stabilizer is an organo-tin stabilizer.

9. A method according to claim 1 wherein the emulsion is used to the extent of 2% to 10% by weight of the PVC.

10. A composition adapted to be used in incorporating processing additives into polyvinyl chloride comprising an aqueous emulsion of from 10% to 45% by weight of a polyvinyl chloride processing lubricant and from 3% to 30% by weight of a stabilizer.

11. A composition according to claim 10 wherein said lubricant is a hydrocarbon wax.

12. A composition according to claim 11 wherein said lubricant comprises a hydrocarbon wax and calcium stearate and said stabilizer is an organo-tin stabilizer.

13. A composition adapted to be used in incorporating processing additives into polyvinyl chloride comprising an aqueous emulsion of 30% to 40% by weight of polyvinyl chloride processing lubricant and from 10% to 15% by weight of a stabilizer.

14. A composition according to claim 12 wherein said emulsion contains from 0.1% to 5% by weight of an emulsifying agent.

15. A composition according to claim 13 wherein said emulsifying agent is an aqueous inorganic alkali.

* * * * *